United States Patent [19]
Rygiol

[11] 3,789,186
[45] Jan. 29, 1974

[54] CURRENT TRANSFER IN CONNECTION WITH ELECTRIC WELDING

[76] Inventor: Henry V. Rygiol, 16437 E. Janine, Whittier, Calif. 90603

[22] Filed: Mar. 13, 1972

[21] Appl. No.: 233,961

[52] U.S. Cl. .............................. 219/130, 226/184
[51] Int. Cl. ............................................. B23k 9/00
[58] Field of Search ...... 219/130, 136, 74; 226/184, 226/187, 190; 314/68

[56] References Cited
UNITED STATES PATENTS

| | | | |
|---|---|---|---|
| 2,475,346 | 7/1949 | Wilson | 219/130 X |
| 2,820,137 | 1/1958 | Ghemar et al. | 219/130 X |
| 3,396,888 | 8/1968 | Rygiol | 226/190 X |
| 3,406,888 | 10/1968 | Ramey | 226/187 |
| 3,447,730 | 6/1969 | Jeanette | 226/184 X |
| 3,672,655 | 6/1972 | Carter | 226/184 X |
| 3,675,837 | 7/1972 | Gerould | 226/187 |

Primary Examiner—J. V. Truhe
Assistant Examiner—Hugh D. Jaeger
Attorney, Agent, or Firm—Edward D. O'Brian

[57] ABSTRACT

In electric welding utilizing a wire to supply metal to a weld area a current is supplied to the wire as the wire is continuously advanced to the weld area. In accordance with the invention the current can be effectively supplied to the wire utilizing a plurality of electrically conductive rollers having surfaces which engage the wire. These rollers roll in synchronism with the wire and transfer current supplied to them to the wire.

5 Claims, 4 Drawing Figures

PATENTED JAN 29 1974 3,789,186

CURRENT TRANSFER IN CONNECTION WITH ELECTRIC WELDING

BACKGROUND OF THE INVENTION

In certain types of electric welding a weld is created utilizing a wire or wire-like member so that such wire is advanced to the weld area where metal is deposited to create a weld as the result of current flow between the end of the wire and one or more metal members in the weld area. Procedures of this type are well known and are commonly utilized. With this type of welding a variety of different devices may be utilized in feeding the wire through a weld area or in advancing the wire to the weld area. One particularly suitable device for such utilization is disclosed in the Rygiol U.S. Pat. No. 3,396,888.

Although the type of welding described in the preceding is well established and although suitable wire feeders for use with this type of welding are known, it is considered that there remains a significant problem with respect to the procedures followed in this type of welding for transferring an electric current to the wire adjacent to the weld area. Conventionally such current transfer is accomplished by passing the wire through an electrically conductive contact tube adjacent to the weld area as the wire is advanced. This type of procedure is considered to have significant limitations and disadvantages.

Although normally such a tube has an internal diameter corresponding to that of the wire passed through it, not infrequently there have been problems in obtaining adequate electrical contact between such a wire and the interior of the tube. Current transfer is, of course, dependent upon such contact. Not always does a wire precisely fit within a tube so that there will be adequate contact. This is considered to be particularly the case when the tube becomes somewhat warm through continued use.

In order to increase the contact between such a transfer tube and the wire so as to insure adequate electrical current transfer such tubes have been bent. This is to insure electrical contact between a wire and a tube by the wire rubbing against the interior of the tube as it passes around a corner or angle. This type of expedient is considered undesirable because in the areas of such contact the interior surface of the tube will tend to wear. Such wear obviously decreases the effective life of a contact tube. Also, as such wear occurs the chances of satisfactory electrical contact between the tube and a wire become diminished.

With welding procedures utilizing both straight and bent current transfer or contact tubes as described briefly in the preceding discussion there is a significant chance of other problems than are specifically indicated in this discussion. Included with such other problems is the danger of so-called "current burn back" and the danger that the wire within a tube will tend to clog up within the interior of it.

With both of the types of contact tubes indicated there is also the problem of internal friction within the contact tube making it difficult to advance the wire to a weld area. In general, the lower the friction impeding wire movement the easier it is to advance a wire without difficulty. When there is little friction opposing wire movement the equipment used to advance the wire need not have the same wire moving capacity as when a wire can be advanced under such conditions that comparatively little friction opposes wire movement.

As a result of these and various related factors it is considered that there is a significant need for improved current transfer to a wire or wire-like member in welding procedures in which such a wire is continuously advanced and moved to a weld area where metal is deposited so as to create a weld. It is also considered that this need has been long standing since welding procedures of the type indicated herein have been known and utilized for many years. In connection with this it is noted that current contact or transfer tubes as discussed in the preceding discussion, although utilitarian, have been specifically identified as needing improvement.

SUMMARY OF THE INVENTION

A broad objective of the present invention is to provide new and improved current transfer for use in connection with electric welding in order to satisfy or meet the need indicated in the preceding discussion. From this it will be more or less implied that another broad objective of the present invention is to provide new and improved current transfer in connection with electric welding of the type indicated so as to overcome certain of the problems and limitations of customary practice.

In its more specific aspects, the invention is concerned with a new and improved method for use in supplying an electric current in a wire as such a wire is advanced in welding as described and is concerned with new and improved apparatuses for use in carrying out this method. The invention also is intended to provide a method as indicated which may be easily and conveniently practiced economically with comparatively little difficulty. An objective of the invention is, also, to provide apparatuses which can be easily and conveniently constructed at a comparatively nominal cost, which may be easily used, and which are capable of giving prolonged, reliable performance with only moderate or minimal needs.

In accordance with the broad concepts of this invention these objectives are achieved by supplying an electric current to a wire used in welding as the wire is advanced by contacting a plurality of spaced points around the outside or the periphery of the wire with wire engaging surfaces located on electrically conductive rollers with sufficient pressure so as to cause the rollers to rotate in synchronism with the wire as the wire is advanced and so as to establish electrical contact with the wire through the rollers. In practicing the present invention in accordance with the concepts of the invention an apparatus utilizes such rollers and means for supplying an electric current to them so that the rollers may in turn supply the current to the wire as the wire is moved or advanced.

BRIEF DESCRIPTION OF THE DRAWING

A brief summary of this type is inherently incapable of setting forth the many aspects of an invention such as the present invention embodying both method and apparatus concepts. Further details of the invention and of these concepts will be apparent from a detailed consideration of this specification and of the accompanying drawing in which.

It is to be emphasized that the concepts embodied within the specific structures shown and utilized in the operation of these structures can be embodied within other somewhat differently constructed and somewhat differently appearing apparatuses through the use or exercise of routine engineering skill. Thus, the present invention is not limited to the specific structures shown or to the precise modes of operation of these structures. Instead, it is to be considered as embracing those concepts and features defined in the appended claims regardless of how these concepts and features are utilized.

DETAILED DESCRIPTION OF THE PREFERRED EMBODIMENT

Figure 1:
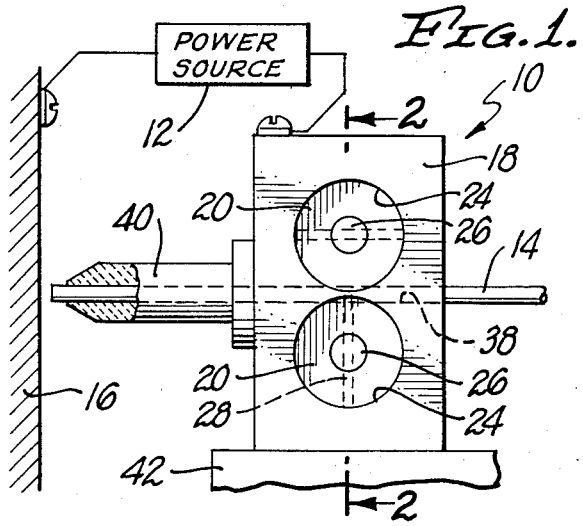
FIG. 1 is a side-elevational view of one embodiment of a presently preferred apparatus in accordance with this invention in which part of the apparatus is broken away for explanatory purposes and in which the utilization of the apparatus is indicated in the diagrammatic manner.
Figure 2:
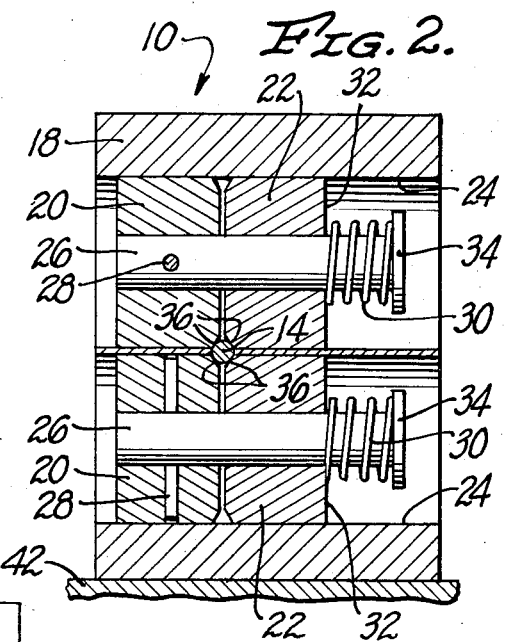
FIG. 2 is a cross-sectional view of the apparatus shown in FIG. 1 taken at line 2-2 of FIG. 1.

In FIG. 1 of the drawing there is shown an apparatus 10 utilized in transferring or supplying current from a conventional power source 12 to a wire 14 so that a weld utilizing metal from the wire 14 may be created or laid down upon a metal member 16. It is to be understood that such a weld may be created at the junction of several metal members if this is desired. With the apparatus 10 the power source 12 is electrically connected to the metal member 16 and to a housing 18 serving as a support member within the apparatus 10.

This housing 18 is preferably manufactured from a carbon-bronze composition such as is commonly utilized for slip rings and other types of electrical apparatuses so that it will easily conduct the current supplied to it. Such a material will carry a current of a comparatively high density and also will serve so that rollers 20 and 22 positioned within parallel, cylindrical bores 24 or openings 24 in the housing 18 will turn freely without undue friction impeding their movement.

These rollers 20 and 22 are preferably manufactured out of a comparatively hard refractory-like metal or metal alloy such as tungsten so that they will have a high current transfer capability and will serve to transfer current to the wire 14 without significant burning or pitting. These rollers 20 and 22 are dimensioned so as to fit closely within the bores 24 in such a manner that they can be rotated within these bores 24 so as to be in electrical contact with the housing 18 at all times.

In each of the bores 24 there is located a centrally positioned shaft 26. These shafts 26 are each attached by a pin 28 to one of the rollers 20. In the structure shown each of the other rollers 22 rotates freely around one of the shafts 26. Small springs 30 biased between the surfaces 32 of the rollers 22 remote from the rollers 20 and heads 34 on the shafts 26 serve to bias these rollers 22 towards the rollers 20. This biasing action is employed so as to hold beveled engaging surfaces 36 on the rollers 20 and 22 in such a manner that pressure is applied to four nearly equally spaced points around the periphery of the wire 14 as this wire 14 passes through a hole 38 in the housing 18.

It will be noted that this hole 38 is located midway between the bores 24 and intersects these bores 24. The hole 38 is also located so as to extend perpendicular to a plane passing through the axes of these bores 24 and of the shafts 26. The hole 38 leads to a small guide tube or nozzle 40 attached to the housing 18 so as to extend therefrom towards the member 16. Preferably this tube 40 is formed of a non-conductive material such as a known ceramic which will convey and guide the wire 14 with a minimum of friction. The housing 18 may be supported for utilization on any sort of a conventional support 42.

When the apparatus 10 is utilized in accordance with the method concepts of this invention the wire 14 is continuously advanced towards this apparatus 10 by a conventional wire feeder (not shown). If desired, it can be advanced through conventional guide tubes serving to prevent it from buckling. As the wire 14 is moved in this manner current will be supplied from the power source 12 to the member 16 and to the housing 18 so that a circuit is completed in a known pattern.

In completing the circuit the housing 18 will supply current to the rollers 20 and 22 because of the contact with them. The contact of these rollers 20 and 22 with the wire 14 as this wire is moved will cause the wire 14 and the rollers 20 and 22 to move in synchronism with one another. This will be a consequence of the spring pressure exerted by the springs 30 biasing the rollers 22 against the rollers 20. As these rollers 20 and 22 are held by the springs 30 so that the wire 14 is engaged by the engaging surfaces 36 current will, of course, be transferred through these rollers 20 and 22 to the wire 14.

It is to be noted that the rollers 20 and 22 in effect "float" within the bores 24 so as to always adjust to a proper desired position relative to the wire 14. The construction described is considered to be particularly desirable in that it enables the apparatus 10 to accommodate wires of different diameters. When the beveled surfaces 36 are formed as preferred at an angle of 30° to the axes of the rollers 20 and 22 a set of these rollers will satisfactorily adjust itself to a relatively wide variety of wire diameters. All of such wires of varying diameters are capable of being held in an apparatus such as the apparatus 10 with adequate pressure for synchronous movement with the rollers 20 and 22 without wire deformation or bending by appropriate adjustments or choice of the springs 30 so that these springs 30 exert adequate pressure for electrical contact and to cause synchronous movement without metal deformation.

Figure 3:
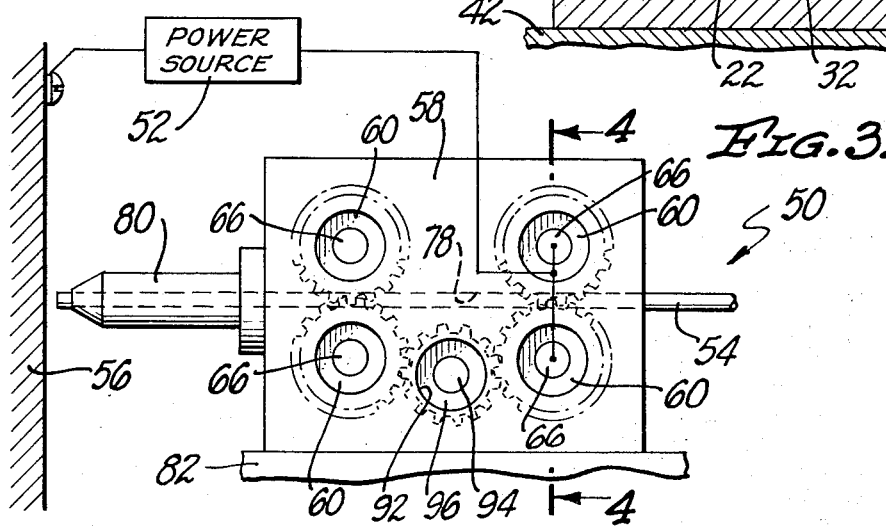
FIG. 3 is a side-elevational view similar to FIG. 1 of a modified form of an apparatus in accordance with this invention which is preferred for some types of utilization.

In FIG. 3 of the drawing there is shown a modified apparatus 50 which is closely related to apparatuses as are disclosed in the Rygiol U.S. Pat. No. 3,396,888. Apparatuses as disclosed in this patent do not, however, have the utility of the apparatus 50. This apparatus 50 is designed to be utilized in connection with a power source 52 corresponding to the power source 12 in supplying a current to a wire 54 and to a metal member 56 corresponding to the member 16 previously described. The apparatus 10 differs from the apparatus 50 in that the apparatus 50 has the utility of driving the wire 54 itself. Thus, this apparatus 50 can serve not only to transfer a current to the wire 54, but also to feed the wire 54.

The apparatus 50 includes a housing 58 serving as a support member within which there are fixed rollers 60 and floating rollers 62 mounted within four different cylindrical bores 64 in the housing 58. It will be noted that these bores 64 are located so that they are in parallel planes which are spaced from one another in the housing 68. The rollers 60 and 62 are carried by shafts 66 corresponding to the shafts 26 with the fixed rollers 60 being secured to the shafts 66 by pins 68. Preferably these shafts 66 are formed of an electrically conductive material such as is specified in connection with the housing 18.

In the apparatus 50 springs 70 corresponding to the springs 30 are biased between surfaces 72 on the floating rollers 62 and heads 74 on the shafts 66 so as to bias the rollers 60 and 62 towards one another in such a manner that beveled surfaces 76 corresponding to the surfaces 36 engage the wire 54 as it passes through a hole 78 in the housing 68 to a guide tube 80 corresponding to the guide tube 40. It is to be noted that the hole 78 extends perpendicular to the planes in the bores 64 so as to intersect these bores 64. The housing 58 may be used on any convenient conventional support 82.

In the apparatus 50 the rollers 60 and 62 are rotatably carried within the bores 64 by conventional internal bearings 84. Further, the bores 64 are connected by an enlarged internal cavity 86 designed to accommodate integral gear flanges 88 on the rollers 60 and 62. These flanges 88 carry gear teeth 90 which fit together so that each of the lowermost rollers 60 and 62 will rotate in synchronism with the roller 60 and 62 located immediately above it.

The housing 58 also includes an internal interiorly enlarged bore 92 within which a conventional drive shaft 94 is mounted in a conventional manner. This drive shaft 94 is secured to two separate drive gears 96, one of which is in internal contact with each of the two lowermost fixed rollers 60 and the other of which is in internal contact with each of the two lowermost floating rollers 62. This structure is designed so that as the shaft 94 is turned the rollers 60 and 62 will be turned in synchronism with it so as to advance the wire 54 as this wire is held between the beveled surfaces 76 as indicated in connection with this apparatus 10 through the operation of the spring 70.

Figure 4:
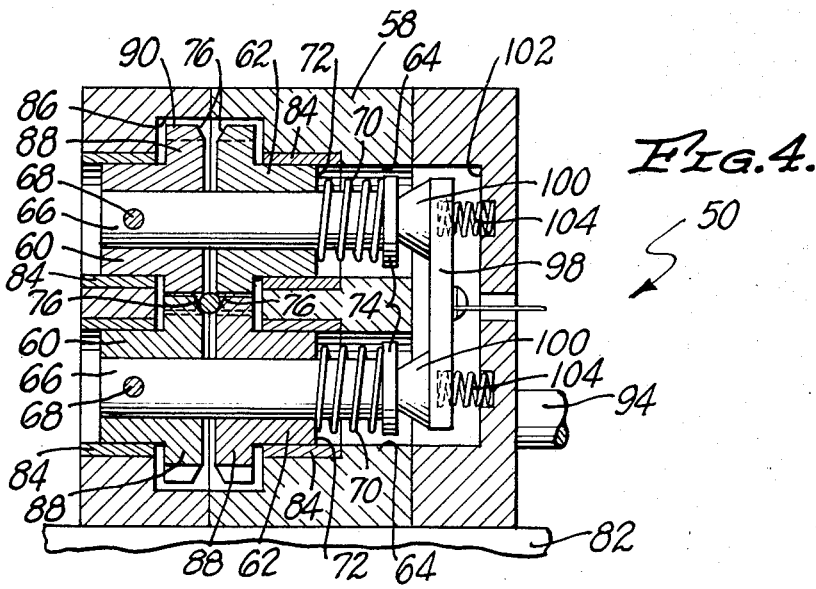
FIG. 4 is a cross-sectional view taken at line 4—4 of FIG. 3.

In the apparatus 50 the shafts 66 are formed of an electrically conductive material so that current can be conveyed to them from a pressure or transfer plate 98 as shown in FIG. 4 of the drawing. This plate 98 is preferably formed of a material such as was noted in connection with the housing 18 with small bosses 100 on it will bear against the ends of the shafts 66 in order to establish electrical contact with them. This plate 98 is preferably resiliently held in position in a cavity 102 in the housing 58 by means of a small biasing springs 104. It will be noted that the power source 52 is directly connected to this plate 98.

With the described structure as the shaft 94 is turned not only will the wire 54 be advanced, but current will be transferred from the plate 98 to the shafts 66 and thence to the rollers 60 and 62. For there to be such transfer between the rollers 60 and 62 and the shafts 66 these rollers 60 and 62 must fit closely with respect to these shafts. These rollers 60 and 62 will then transfer the current to the wire 54 as the wire is advanced so that simultaneously the wire 54 is both electrified and moved towards a weld area. It will be realized that during this operation the transfer plate 98 serves essentially as a rotary contact serving to transfer current to the mechanical structure described for rotating the various rollers 60 and 62.

The apparatuses 10 and 50 indicated are comparatively simple, effective apparatuses which can be constructed at relative nominal costs. These apparatuses 10 and 50 are comparatively simple to utilize. Depending upon the nature of the wire being used in a welding operation and the availability of other supporting equipment such as a known wire feeder, in some applications it may be desirable to utilize an apparatus such as the apparatus 10 while in other applications it may be desirable to utilize an apparatus such as the apparatus 50. An important feature of these apparatuses 10 and 50 lies in the fact that the construction described permits these apparatuses to be used with and to adjust to wires of various diameters. In any utilization of an apparatus as described such an apparatus will normally give reliable performance over an extended period and will only require moderate attention.

One of the major reasons as to the latter being true pertains to the manner in which current is transferred in apparatuses as described. In these apparatuses the rollers indicated engage a wire at four different points around the periphery of the wires which are in a plane transverse to the center of the wire. Because of this the amount of current flowing to the wire will be divided amongst the four different rollers so as to reduce the current flow at any one point to one-fourth of the total current being transferred.

This is to be compared with the manner in which contact tubes and in particular worn contact tubes operate. In such tubes frequently the entire current flow through the wire is concentrated to one area where the wire bends to make engagement with the tube interior. Such a concentration of current is known to cause so-called "burn outs" which in effect may be considered as a type of weld securing the wire to the contact tube so that the wire will not be advanced in a desired manner.

This type of consequence is avoided with the present invention because of the current distribution and because of the manner in which the current is transferred. Such transfer occurs by rolling contact along lines emienenting from the points where the rollers engage a wire. With rollers as described there is little or no danger of arcing securing the wire to the rollers. Further, the contact between the rollers and the wire is far enough from the axes of rotation of the rollers so that what may be considered as a lever arm-type of advantage is achieved which tends to prevent adherence between the wire and the rollers such as occurs in conventional contact tubes.

I claim:

1. An apparatus for use in supplying an electric current to a wire as such a wire is advanced to a welding surface where an electric weld is created through the utilization of the wire and the current supplied to the wire, in which the improvement comprises:
   a support member,
   two pairs of rollers of a refractory metal or alloy thereof, each of said rollers being electrically conductive, each of said rollers having a beveled wire engaging surface,
   two parallel axles, the rollers of each of said pairs being located on one of said axles so that said wire engaging surfaces are capable of engaging a wire positioned so as to extend relative to them and said support member at a plurality of points a first roller of each of said pairs being positioned upon the axle upon which it is located so as to be incapable of moving along its axis relative to the axle upon which it is located, said first rollers of said pairs being located adjacent to one another, the other, second roller, of each of said pairs being rotatably held upon the axles upon which they are located so as to be capable of being moved axially along the length of the axles upon which they are located, spring means for independently moving each of said second rollers towards its associated first roller, said spring means serving to bias said rollers of said pairs so that such a wire is engaged firmly enough so that all of said rollers rotate in synchronism with such a wire as the wire is advanced and firmly enough so as to establish electrical contact with such a wire, means for supplying an electric current to said rollers as said rollers rotate so that said rollers may in turn supply the current supplied to them to a wire passing between them so that such current may be used in making a weld through the utilization of the wire and the current.

2. An apparatus as claimed in claim 1 wherein:
said rollers are rotated by movement of said wire.

3. An apparatus as claimed in claim 1 including:
means for rotating said rollers in synchronism with one another, the engagement of said rollers serving to cause advancement of said wire.

4. An apparatus as claimed in claim 1 wherein:
there are two hollow bores within said support member,
said axles are unattached to said support member,
said rollers are rotatably mounted on said support members by being positioned within said bores, and
said rollers fit closely within said bores so as to be in electrical contact with said support members through the walls of said bores, and
said means for supplying is connected to said support member so as to supply current to said support member.

5. An apparatus as claimed in claim 1 including:
mechanical means for rotating all of said rollers in synchronism with one another and wherein,
said means for supplying includes rotary contact means engaging said mechanical means.

* * * * *